UNITED STATES PATENT OFFICE.

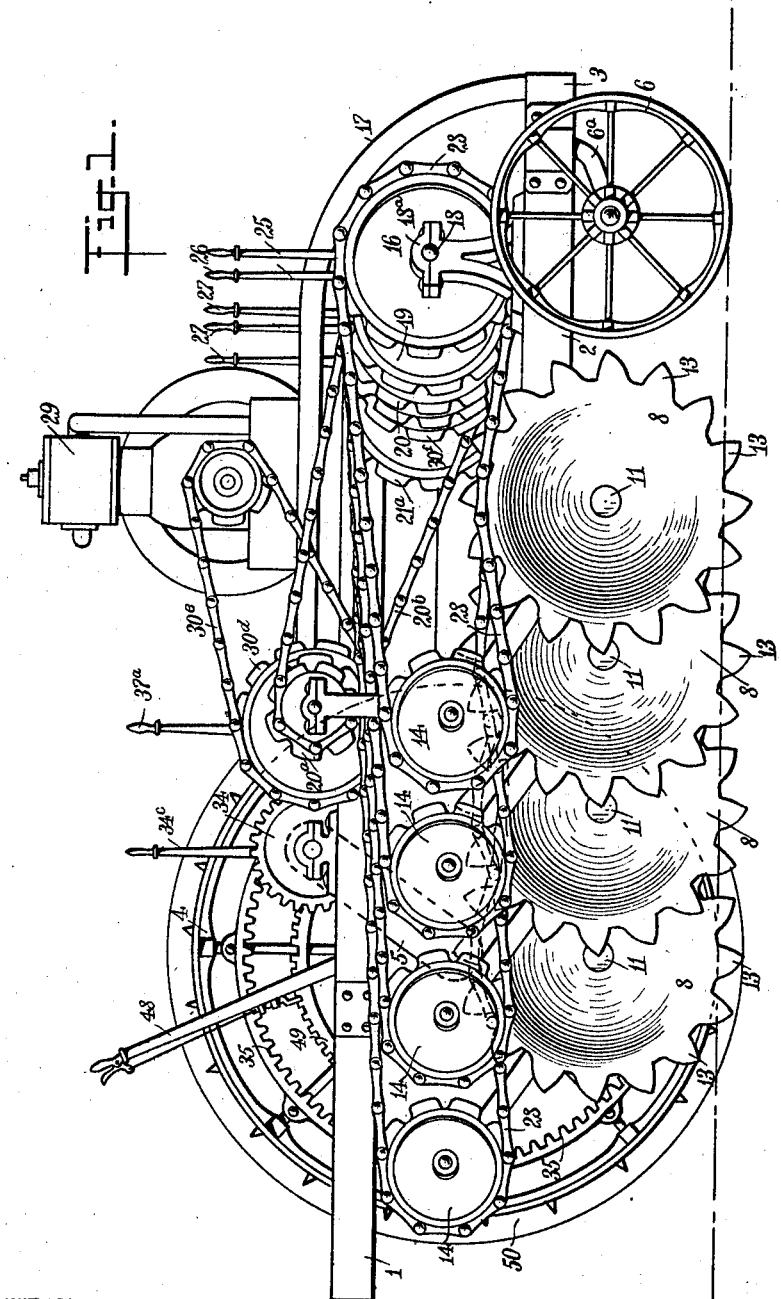

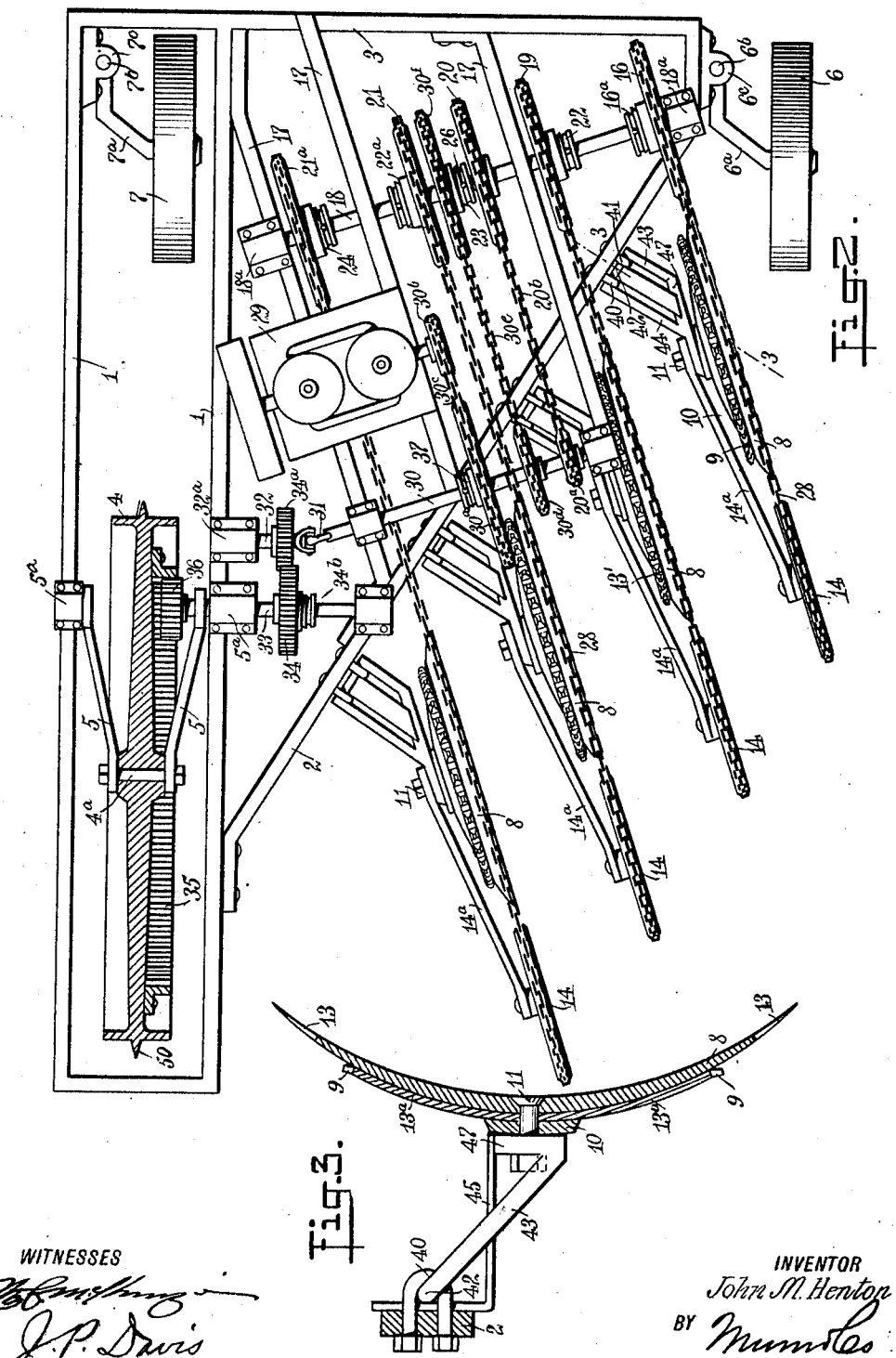

JOHN M. HENTON, OF EDGEMONT, SOUTH DAKOTA.

MOTOR DISK PLOW.

1,004,167.   Specification of Letters Patent.   Patented Sept. 26, 1911.

Application filed November 11, 1910. Serial No. 591,829.

*To all whom it may concern:*

Be it known that I, JOHN M. HENTON, a citizen of the United States, and a resident of Edgemont, in the county of Fall River and State of South Dakota, have invented a new and Improved Motor Disk Plow, of which the following is a full, clear, and exact description.

Among the principal objects which the present invention has in view are: to provide a carrying frame and traction mechanism therefor embodying a self contained motor and transmission mechanism arranged to propel the said frame intermittently and as controlled; to provide means for, at will, varying the position of the driving wheels of the traction mechanism relative to the guiding wheels of the said frame to vary the pivot on which the said frame is swung; to provide rotary plowing members and a rotary driving mechanism therefor arranged to rotate the said plowing members independently of the traction mechanism of the said carrying frame; to provide plowing devices constructed and arranged to grip the ground in a manner to form traction devices auxiliary to the main traction mechanism; to provide means whereby the rotary plowing devices are rotated at a peripheral speed in excess of the peripheral speed of the traction wheels; and to provide rotary plowing devices having peripheral extensions adapted to shear surface vegetation and to shatter the subsoil.

One embodiment of the present invention is disclosed in the structure illustrated in the accompanying drawings, in which like characters of reference denote corresponding parts in all the views, and in which—

Figure 1 is a side elevation of a rotary disk plow embodying a traction mechanism and controlling devices therefor, constructed and arranged in accordance with the present invention; Fig. 2 is a plan view of the same showing the traction wheel in section, the section being taken on the horizontal median line of the said wheel; and Fig. 3 is a detail view in vertical section, showing a plowing disk and mounting therefor constructed and arranged in accordance with the present invention.

In the accompanying drawings the carrying frame for the plows is formed by two land side framing beams 1, 1, a cross header beam 3 and an inclined gang beam 2. The framing beams 1, 1 are separated in parallel longitudinal arrangement, as shown best in Fig. 2 of the drawings. Between the beams 1, 1 is supported a main traction wheel 4. The wheel 4 is mounted on an axle pin $4^a$ which is passed through eyelets in the ends of swinging eye-bars 5, 5. The eye-bars 5, 5 are provided with trunnions mounted in bearings $5^a$, $5^a$, disposed on the beams 1, 1, substantially as shown in the drawings.

The length of the eye-bars 5, 5 is regulated so that when the said bars are swung about their pivotal bearings $5^a$, $5^a$, the wheel 4 will be disposed in line with the rearmost of the plow members or the foremost thereof. The purpose in changing the relative location of the wheel 4 is to vary the pivot point on which the frame and plow members supported thereby turn, it being understood that the wheel 4 is a pivot on which the frame turns.

The carrying frame is further supported by pivot wheels 6 and 7. The wheels 6 and 7 are mounted on the extended ends of bracket arms $6^a$ and $7^a$, which are pivoted in vertical extensions $6^b$ and $7^b$ held in vertically disposed bracket bearings $6^c$ and $7^c$. The bracket arms $6^a$ and $7^a$ are suitably connected, and are provided with any form of steering apparatus for shifting the angular position of the wheels 6 and 7 with relation to the frame to guide the same. No steering gear is shown in the present drawings, the object being to avoid unnecessary complication in the drawings.

The wheel 4 is provided with an internal gear ring 35, which is bolted or otherwise rigidly secured to the spokes of the wheel 4. Meshed in the teeth of the ring 35 is a driving pinion 36. The pinion 36 is fixedly mounted on a shaft 33, which passes through a perforation formed in one end of the innermost of the eye-bars 5, 5. The trunnion formed on the end of the opposite eyebar 5 and the shaft 33 are accurately alined in the bearings 5ª, 5ª, and form the pivots on which the eye-bars 5, 5 and wheel 4 rotate. In rotating the wheel 4 about the pinion 36 the engagement between the said wheel 4 and pinion 36 is maintained.

Mounted loosely on the shaft 35 is a gear wheel 34. The wheel 34 is tooth engaged with a gear wheel 34ª fixedly mounted on a short shaft 32. The shaft 32 is mounted in bearings 32ª mounted on one of the beams 1, and forms one of the jaws of a knuckle joint 31. The opposite jaw of the knuckle joint 31 is formed on the main shaft 30. The main shaft 30 has fixedly mounted thereon a main driven sprocket wheel 30ª. The sprocket wheel 30ª is loosely mounted on the main shaft 30, and is operatively connected to a driving sprocket wheel 30ᵇ by means of a chain 30ᶜ. Keyed to the shaft 30 adjacent to the wheel 30ª, is a clutch 37. When the clutch 37 is moved by the lever 37ª to engage the wheel 30ª the shaft 30 and transmission mechanism connected therewith are set in operation. Adjacent the gear wheel 34, and keyed to the shaft 33, is a clutch 34ᵇ, which clutch is operated by a lever 34ᶜ to engage or be disengaged from the wheel 34 to drive the shaft 33, pinion 36 and wheel 4.

By means of the arrangement wherein the shaft 33 and gearing connected therewith are, at will, moved into and out of operative engagement with the driving mechanism, the wheel 4 may be stopped while the driving mechanism of the machine operates to rotate the plow members, and by them, as hereinafter described, assist in turning the plow about the pivot formed by the wheel 4.

To drive the shaft 30 there may be employed any suitable character of motor, that shown in the drawings being an internal combustion engine 29. Fixedly mounted on the main shaft 30 are sprocket wheels 30ᵈ and 20ª. The wheels 30ᵈ and 20ª are relatively varied in diameter to transit through the chains 30ᵉ and 20ᵇ respectively different peripheral speeds to the sprocket wheels 30ᶠ and 20. The wheels 30ᶠ and 20 are each loosely mounted upon a countershaft 18, for the transmission of power to the rotary plow disks 8, 8. The countershaft 18 is mounted in bearings 18ª, 18ª supported on the carrying frame of the machine.

Interposed between the wheels 20 and 30ᶠ is a clutch 23, which clutch is manipulated by the lever 26 to be thrown alternately into engagement with either of the wheels 20 or 30ᶠ. According as the said clutch engages the one or other of the wheels 20 or 30ᶠ the rotating of the shaft 18 is varied by reason of the difference in the peripheral speeds of the wheels 20ª and 30ᵈ on the main shaft 30. The variation in the speed of the shaft 18 varies the speed of rotation of the plow disks 8, 8, forming thereby a control in the operation of the plow resulting in better pulverizing or breaking up the furrow according to the ground being worked.

The rotary disks 8, 8 are concavo-convex, and are rotatively mounted on bolts 11 formed in the brackets 43, 44. The brackets are pivoted by means of a loop section 42 within the staples 40 and 41, which are passed through the gang beam 2. Held rigidly between the loop section 42 of the bracket and the gang beam 2, and supported at the outer or free end on the arm 47 of the bracket, is a spring 45. The spring 45 operates in each of the brackets to permit the disk 8 to lift when and as the same strikes upon or overrides a partly hidden stone or other substance too hard for cutting.

The disks 8 are constructed at their peripheries to form a peripheral set of teeth 13, 13. The teeth 13, 13 are sharpened on the forward edge to form knife-like members for cutting surface vegetation or trailing rubbish. The following edge of the teeth 13, 13 are squared to form bearing surfaces for the rolling blocks connecting the links of the chains 28, 28. The teeth 13, 13 serve in this manner as sprocket teeth for the rotation of the disks 8, 8, being engaged for that purpose by the chains 28, 28. The chains 28, 28 are operatively engaged by idlers 14, 14, which are mounted on the ends of brackets 14ª, 14ª, which brackets are secured by means of the bolts 11, 11 to the brackets 43, 44, as shown best in Fig. 2 of the drawings. The chains 28, 28 are endless, and the opposite extensions of the said chains are engaged by sprocket wheels 16, 19, 21 and 21ª.

The disks 8, 8 are thin metal disks, and are backed by a shield 13ª, as seen best in Fig. 3 of the drawings. Interposed between the shield 13ª and the arm 47 of the bracket 43—44 is a bearing washer 10. The shields 13ª are provided at their periphery with sprocket teeth 9, 9, which may be arranged to engage the chains 28, 28 or other chains substituted therefor.

The operation of a machine constructed and arranged substantially as shown in the accompanying drawings, and as herein described, is as follows: The wheel 4 is raised and lowered by means of a lever 48. The lever 48 is pivotally mounted on the framing beam 1, and is pivotally connected with the innermost of the eye-beams 5. Fixedly mounted upon the framing beam 1 adjacent the lever 48 is a toothed quadrant 49. The lever 48 is provided with a grip lever detent bolt of usual construction, adapted to engage the teeth of the quadrant 49 to hold the lever 48. Any suitable connection between the lower end of the lever 48 and the bar 5 may be employed. It will be seen that as the lever 48 is swung about its pivot the bar 5 is rotated on the shaft 33. As the wheel 4 is raised, the plow disks 8 are permitted to sink deeper into the ground, and the wheels 6 and 7 are adjusted to level the carrying frame to even the operation of the plow disks. It is understood that the wheel 6 runs in the furrow previously formed, while the wheel 7 tracks on the unplowed land. To prevent drift in the machine the wheel 4 is provided with a central colter flange 50, as best seen in Fig. 2 of the drawings. The height of the frame having been adjusted, and the motor 29 having been started, the clutch 37 is thrown into engagement by means of the lever 37ª with the wheel 30ª, thus starting the main driving shaft 30. The lever 34ᶜ is then moved to throw the clutch 34ᵇ to engage the wheel 34, thereby rotating the shaft 33, and through the gear 36 rotating the traction wheel 4. The machine gathering headway, the lever 26 is then shifted to engage the countershaft 18 with the one or other of the wheels 20 or 30ᶠ, thereby selecting the rate of rotation of the disks 8, 8. It will be observed that the disks 8, 8 bury the teeth 13, 13 in the ground at the bottom of the furrow formed by the said disks, and add a traction impulse to the plow in aid of the traction mechanism as exerted upon and by the wheel 4.

In the operation of the disks 8, 8, the transmission mechanism operatively connecting the shaft 30 and the said disks may be arranged to drive the disks at a rate of speed exceeding the peripheral speed of the wheel 4, thereby causing the disks 8, 8 to saw or separate the earth and to shatter the same, tearing it from the surrounding earth in a manner to gap or part the overturned earth.

When the plow thus constructed arrives at the end of a furrow the operator manipulates the lever 34 to disengage the shaft 33 from the gear wheel 34 and the driving mechanism connected therewith to permit the wheel 4 to stop. The driving of the disks 8, 8 being continued after the wheel 4 has stopped, the said disks assist in swinging the frame around the wheel 4. In this operation the wheels 6 and 7, if desired, may be permitted to swing as caster wheels, or may be guided by a suitable guiding mechanism to be added to the machine as above mentioned. When the machine has been turned at the proper angle to the furrow just completed, the clutch 34ᵇ is engaged with the wheel 34, starting the rotation of the traction wheel 4, and the plow now progresses on the changed furrow.

When it is desired to move the plow over a public road or through fields not to be plowed, the clutch 23 is adjusted to a position intermediate the wheels 20 and 30ᶠ, and out of engagement with both of said wheels. In this position of the clutch 23 the countershaft 18 is held inactive and the disks 8, 8 arrested. The wheels 4, 6 and 7 are then adjusted to lift the frame and plows carried thereby until the said plows are hoisted above the surface of the ground. The clutch 34ᵇ is then thrown into engagement to operate the traction wheel 4, by which the machine is then driven. The shaft 30 and the motor 29 are supported by a lifted frame formed by the curved beams 17, 17, as shown best in Fig. 1 of the drawings. The frame formed by the beams 17 lifts the motor, as shown in said Fig. 1, above the wheels 16, 19, 21 and 21ª and chains connected therewith.

As shown in the drawings, and particularly in Fig. 2 thereof, the wheels 16, 19, 21 and 21ª are provided with clutches 16ª, 22, 22ª and 24, by the engagement whereof the said clutches lock each of the said wheels upon the shaft 18. This construction secures for the machine a flexibility of operation, making it possible to disconnect each of the said wheels and plow disks connected therewith from the shaft 18. The said clutches are manipulated by the levers 25 and 27.

Having thus described my invention, what I claim as new and desire to secure by Letters Patent is:—

1. A motor disk plow, comprising a plurality of rotatable disks each of which is provided with teeth on its periphery; a plurality of frames supporting said disks; a main frame by which said frames are carried; rotatable members on each disk frame and the main frame; and a chain passing around the said rotatable members and engaging the teeth on the disk whereby the disk may be rotated.

2. A motor disk plow, comprising a plurality of rotatable disks each of which is provided with teeth on its periphery; a plurality of frames supporting said disks; a main frame by which said frames are carried; rotatable members on each disk frame and on the main frame; chains passing around the said rotatable members and engaging the teeth on said disks at the top thereof whereby the disks may be rotated; a driving mechanism for said rotatable members; and a clutch mechanism for engaging the said rotatable members and said driving mechanism.

3. A motor disk plow, comprising a plurality of rotatable disks each of which is provided with teeth on its periphery; a plurality of frames supporting said disks; a main frame by which said frames are carried; rotatable members on each disk frame and on the main frame; chains passing around the said rotatable members and engaging the teeth on said disks at the top thereof whereby the disks may be rotated; a driving mechanism for said rotatable members; and separate clutch mechanisms for engaging each of said rotatable members and said driving mechanism.

4. In a motor disk plow embodying a carrying frame, and a self-contained driving mechanism mounted thereon consisting in part of a plurality of driving sprocket chains; a plurality of plow disks having gear-tooth-like peripheral extensions for engagement with said driving chains of the driving mechanism.

In testimony whereof I have signed this specification in the presence of two subscribing witnesses.

JOHN M. HENTON.

Witnesses:
W. T. STANLEY,
C. A. STEWART.

Copies of this patent may be obtained for five cents each, by addressing the "Commissioner of Patents, Washington, D. C."